United States Patent Office 3,242,209
Patented Mar. 22, 1966

3,242,209
IMINOMETHYLENEUREAS
Wolfgang Jentzsch, Ludwigshafen (Rhine), Herbert Stummeyer, Mannheim, and Adolf Fischer, Mutterstadt, Pfalz, Germany, assignors to Badische Anilin- & Soda-Fabrik Aktiengesellschaft, Ludwigshafen (Rhine), Germany
No Drawing. Filed May 7, 1963, Ser. No. 278,774
Claims priority, application Germany, May 16, 1962, B 67,266
5 Claims. (Cl. 260—553)

This invention relates to new urea derivatives and to herbicidal compositions which contain said derivatives.

It is known to use trisubstituted urea derivatives for controlling weeds; examples are N-p-chlorophenyl-N'-dimethylurea or N-3,4-dichlorophenyl - N' - dimethylurea. These herbicides have the disadvantage however that they render the soil incapable of use for agricultural cultivation for a relatively long period. Moreover some of them have only a slight selectivity, especially when used in post-emergence treatment of crops such as grain.

It is also known to use substituted phenoxyacetic acids for the selective control of broad-leaved weeds in grain crops. These active substances cannot be used however until relatively late after emergence of the grain. After they have ben used, their action becomes visible only slowly. Valuable special crops, for example wine or tobacco, are greatly endangered by these active substances because even small amounts thereof applied unintentionally to these crops are sufficient to effect serious damage to the useful plants or to destroy them.

It is an object of the invention to provide new urea derivatives having valuable properties. A further object of the invention is to provide compositions which have a good herbicidal action against undesirable plant growth without destroying the useful plants. A further object of the invention is to provide herbicidal compositions which destroy undesirable plant growth within a short time after application and which are rapidly decomposed in the soil so that no lasting infertility of the soil occurs.

We have now found that substituted iminomethyleneureas having the general formula:

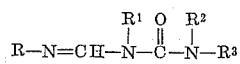

in which R and $R^1$ are identical or different aliphatic radicals having one to four carbon atoms in the aliphatic radical and which may bear alkoxy or dialkylamino groups and $R^2$ and $R^3$ are identical or different and denote hydrogen, aliphatic, cycloaliphatic, arylaliphatic or aromatic radicals, which may bear halogen or alkoxyl or dialkylamino groups, have a good compatibility with rice, cotton and cereals and a good herbicidal action on dicotyledonous plants and annual grasses. In the above formula, R and $R^1$ each preferably represent lower alkyl or a lower alkyl substituted by lower alkoxy or by dimethylamino; $R^2$ is preferably hydrogen or methyl; and $R^3$ is preferably alkyl of 1 to 8 carbon atoms, cycloalkyl of 6 to 8 carbon atoms, phenyl, halogen-substituted phenyl or phenyl substituted by lower alkoxy. The term "lower" is used here with reference to an alkyl or alkoxy group of 1 to 4 carbon atoms.

The herbicides according to this invention are particularly advantageous because of the rapidity with which their action commences and the brevity of their aftereffect as compared with other urea derivatives.

The agents may be used in the form of solutions, emulsions, suspensions or dusts. The form in which they are used depends entirely on the particular application and the aim should be to ensure good distribution of the active substances.

Mineral oil fractions having medium to high boiling point, for example kerosene or diesel oil, coal tar oil and oil of vegetable or animal origin, also cyclic hydrocarbons, for example tetrahydronaphthalene and alkylated naphthalenes are suitable for the preparation of solutions capable of being sprayed direct; the active substances are added to these liquids, if desired with the use of auxiliary solvents, for example xylene.

Solutions in low boiling solvents, such as alcohols, for example ethanol, isopropanol or methylcyclohexanol; ketones, for example acetone or cyclohexanone; ethers, for example tetrahydrofuran or dioxane; hydrocarbons, for example benzene, toluene and xylene; or chlorinated hydrocarbons, for example chloroform, carbon tetrachloride, tetrachloroethane, ethylene chloride or trichlorethylene, are less suitable for direct use but rather in combination with suitable emulsifiers for the production of concentrates for the preparation of aqueous emulsions.

Aqueous formulations may be made up from emulsion concentrates, pastes or wettable powders (spray powders) by adding water. For the preparation of emulsions, the substances, either alone or dissolved in one of the said solvents, may be homogenized in water by means of wetting or dispersing agents.

Cation-active emulsifying agents, such as quaternary ammonium compounds, and also anion-active emulsifying agents, such as soaps, soft soaps, aliphatic long chain sulfuric acid monoesters and aliphatic aromatic sulfonic acids, ligninsulfonic acid, long chain alkoxyacetic acids, and also nonionic emulsifying agents, for example polyethylene ethers of fatty alcohols, and polyethylene oxide condensation products, may be used as emulsifying and dispersing agents. It is also possible however to prepare concentrates consisting of active substances, emulsifying or dispersing agent and if desired solvent, the said concentrates being suitable for dilution with water. Compounds having an adequate basicity may be used, even after salt formation with acids, as salts in aqueous solution.

Dust compositions may be prepared by mixing or grinding the active substance together with a solid carrier material. Examples of carrier materials are: talc, diatomaceous earth, kaolin, bentonite, calcium carbonate, boric acid, calcium phosphate, wood flour, cork flour, carbon and other materials. Granules which can be scattered may be obtained for example by using ammonium sulfate as the carrier material. On the other hand the carrier material may also be impregnated with solutions of the active substance in liquid solvents. By adding wetting agents and protective colloids it is possible to obtain powder formulations or pastes which are capable of being suspended in water and used as sprays.

To suit better the different purposes for which they are intended the various formulations may be adapted in the conventional manner by the addition of substances which improve distribution, adhesion, rain resistance and penetrating power, such as fatty acids, resins, wetting agents, emulsifying agents, glues or alginates. The biological activity spectrum may also be widened by adding substances having bactericidal properties, fungicidal properties or properties affecting plant growth, as for example substituted phenoxycarboxylic acids, substituted carboxylic anilides, triazine derivatives, urea derivatives, for example N-p-chlorophenyl-N'-methyl-N'-isobutinylurea or N-cyclooctyl-N'-dimethylurea, chlorinated fatty acid esters, anhydrobenzoylanthranilic acid, and also by combination with fertilizers.

The new active substances may be prepared in known manner by reaction of N,N'-disubstituted formamidines having the general formula:

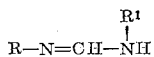

(in which R¹ and R have the meanings given above) with (a) an isocyanate having the formula R²NCO or (b) a carbamyl chloride having the formula

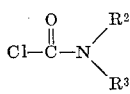

(in which R² and R³ have the meanings given above) and an alkaline compound by a conventional method.

The following are examples of formamidines which may be used as initial materials:

N,N'-dimethylformamidine
N,N'-diethylformamidine
N,N'-dipropylformamidine
N,N'-diisobutyl-formamidine
N,N'-bis-(β-dimethylaminopropyl)-formamidine and
N,N'-bis-(β-methoxypropyl)-formamidine.

Examples of isocyanates are:

Ethyl isocyanate
Isopropyl isocyanate
n-Butyl isocyanate
5-ethyl-n-hexyl isocyanate
Dodecyl isocyanate
Chloroethyl isocyanate
β-dimethylaminopropyl isocyanate
Allyl isocyanate
Benzyl isocyanate
p-Methoxybenzyl isocyanate
Cyclohexyl isocyanate
Cyclooctyl isocyanate
Phenyl isocyanate
p-Ethoxyphenyl isocyanate
p-Chlorophenyl isocyanate and
3,4-dichlorophenyl isocyanate.

The following examples of carbamyl chlorides:

Carbamyl chloride
Dimethylcarbamyl chloride
Diethylcarbamyl chloride
Pyrrolidine-N-carboxylic chloride having the formula:

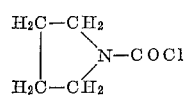

Methylisooctyl carbamyl chloride
Methylphenyl carbamyl chloride and
Di-p-chlorophenyl carbamyl chloride.

The N,N'-disubstituted formamidines are advantageously used as such for the production of the herbicides, but it is also possible to use a salt, for example the hydrochloride, but it is then necessary to add an equivalent amount of an alkaline compound, preferably a tertiary amine, for example triethylamine, tributylamine or pyridine.

Both when using an isocyanate and when using a carbamyl chloride, the reaction is carried out at temperatures between 0° and 150° C., preferably between 20° and 110° C., in inert solvents, for example diethyl ether, diisopropyl ether, dioxane, carbon tetrachloride, benzene, chlorobenzene, toluene or petroleum ether. It is advantageous to react the reactants in the molar ratio 1:1. In case (a), the substituted formamidine dissolved in the solvent may be placed in the reactor and the isocyanate, if desired diluted with solvent, allowed to flow in. In case (b), the substituted formamidine together with an alkaline compound, preferably a tertiary amine, for example, triethylamine, tributylamine or pyridine, is placed in a solvent and the substituted carbamyl chloride, if desired diluted with solvent, added. Working up takes place by filtration from deposited salt if necessary, evaporation of the solution and purification of the remaining residue by recrystallization or vacuum distillation.

The following procedures may be followed for the production of the new active substances:

(1) 305 parts (parts by weight) of ethyl isocyanate, dissolved in 600 parts of benzene, is allowed to flow during the course of four hours into 360 parts of dimethylformamidine dissolved in 1000 parts of benzene; the reaction mixture thus heats up from 15° to 40° C. When all has been added, the whole is boiled under reflux for three hours, the solvent is distilled off and the oil which remains distilled. 548 parts of N-ethyl-N'-methyl-N'-(methylaminomethylene)-urea having the boiling point 115° C./12 mm. Hg is obtained.

| Analysis | C | H | N | O |
|---|---|---|---|---|
| $C_6H_{13}N_3O$ [143]: | | | | |
| Calculated | 50.3 | 9.09 | 29.4 | 11.2 |
| Found | 50.3 | 9.4 | 28.9 | 11.3 |

(2) 150 parts of 2-ethyl-n-hexyl isocyanate is allowed to flow slowly at room temperature into 72 parts of dimethylformamidine dissolved in 800 parts of dry benzene. The temperature of the reaction mixture thus rises to 45° C. The whole is then boiled under reflux for three hours. The oil remaining after evaporating the benzene is distilled in vacuo. 170 parts of N-2'-ethyl-n-hexyl-N'-methyl-N'-(methyliminomethylene)-urea having the boiling point 147° to 150° C./13 mm. Hg is obtained.

| Analysis | C | H | N | O |
|---|---|---|---|---|
| $C_{12}H_{15}N_3O$ [197]: | | | | |
| Calculated | 63.44 | 11.01 | 18.5 | 7.05 |
| Found | 63.0 | 11.2 | 19.1 | 7.0 |

(3) 188 parts of cyclohexyl isocyanate dissolved in 400 parts of toluene is dripped into 108 parts of dimethylformamidine dissolved in 400 parts of toluene. When all has been added, the whole is boiled for three hours under reflux, the solvent is distilled off and the remaining oil is distilled in vacuo. 240 parts of N-cyclohexyl-N'-methyl-N'-(methyliminomethylene)-urea having the boiling point 138° to 140° C./13 mm. Hg is obtained.

| Analysis | C | H | N | O |
|---|---|---|---|---|
| $C_{10}H_{19}N_3O$ [197]: | | | | |
| Calculated | 60.9 | 9.7 | 21.3 | 8.1 |
| Found | 60.9 | 10.0 | 21.6 | 7.4 |

(4) 460 parts of cyclooctyl isocyanate and 215 parts of dimethylformamidine, each dissolved in 1500 parts of benzene, are reacted and worked up in the way described in 3 above. 546 parts of N-cyclooctyl-N'-methyl-N'-(methyliminomethylene)-urea having the boiling point 115° C./0.3 mm. Hg is obtained by distillation of the remaining crude product.

| Analysis | C | H | N | O |
|---|---|---|---|---|
| $C_{12}H_{23}N_3O$ [225]: | | | | |
| Calculated | 64.0 | 10.2 | 18.7 | 7.1 |
| Found | 64.3 | 10.7 | 18.4 | 6.6 |

(5) 108 parts of dimethylformamidine dissolved in 400 parts of benzene and 179 parts of phenyl isocyanate dissolved in 400 parts of benzene are reacted in the way described in (3) above. The benzene is distilled off and the crystal mass remaining is recrystallized from a mixture of petroleum ether and ethyl acetate in the ratio 10:1. 25 parts of N-phenyl-N-methyl-N'-(methyliminomethylene)-urea having the melting point 49° to 52° C. is obtained.

| Analysis | C | H | N | O |
|---|---|---|---|---|
| $C_{10}H_{13}N_3O$ [191]: | | | | |
| Calculated | 62.8 | 6.81 | 22.0 | 8.4 |
| Found | 63.0 | 6.8 | 21.7 | 8.7 |

(6) 153.5 parts of p-chlorophenyl isocyanate is slowly dripped into 72 parts of dimethylformamidine dissolved in 800 parts of diisopropyl ether and the whole then boiled under reflux for five hours. The solvent is distilled off. The remaining residue is recrystallized from a mixture of petroleum ether and ethyl acetate. 170 parts of N-p-chlorophenyl-N'-methyl-N'-(methyliminomethylene)-urea having the melting point 83° to 85° C. is obtained.

| Analysis | Cl |
|---|---|
| $C_{10}H_{12}N_3OCl$ [225.5]: | |
| Calculated | 15.76 |
| Found | 15.6 |

(7) 540 parts of dimethylcarbamyl chloride dissolved in 300 parts of benzene is allowed to flow at 20° to 35° C. into a mixture of 360 parts of dimethylformamidine and 606 parts of triethylamine dissolved in 100 parts of benzene, the whole then heated at 50° to 60° C. for five hours, cooled, triethylamine hydrochloride filtered off and the solvent evaporated. 478 parts of N,N,N'-trimethyl-N'-(methyliminomethylene)-urea having the boiling point 102° C. at 12 mm. Hg is obtained by vacuum distillation of the remaining oil.

| Analysis | C | H | N | O |
|---|---|---|---|---|
| $C_6H_{13}N_3O$ [143]: | | | | |
| Calculated | 50.3 | 9.1 | 29.4 | 11.2 |
| Found | 50.5 | 9.2 | 29.2 | 11.3 |

The following table contains further active substances of the general formula:

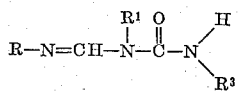

which may be obtained in the manner described above:

| R and $R^1$ denote— | $R^3$ denotes— | Melting point, °C. | Boiling point, °C./mm. Hg |
|---|---|---|---|
| $CH_3$ | –⟨⟩–$O$-$C_2H_5$ | 119–121 | |
| $n$-$C_3H_7$ | $n$-$C_4H_9$ | | 110–112/0.5 |
| $n$-$C_3H_7$ | 2-ethyl-n-hexyl | | 120–123/0.4 |
| $n$-$C_3H_7$ | –⟨⟩– | | 136–140/0.5 |
| $n$-$C_3H_7$ | –⟨⟩–$O$-$C_2H_5$ | 39–40 | |
| $n$-$C_4H_9$ | 2-ethyl-n-hexyl | | 139–141/0.5 |
| $n$-$C_4H_9$ | –⟨⟩– | | 130–132/1 |
| $n$-$C_4H_9$ | –⟨⟩– | | 142–148/0.5–1 |
| $i$-$C_4H_9$ | –⟨⟩–$O$-$C_2H_5$ | 47–49 | |
| $i$-$C_4H_9$ | –⟨⟩– | | 116–120/0.2 |
| $H_3C$-$CH$-$CH_2$-<br>$\|$<br>$H_3C$-$N$-$CH_3$ | $n$-$C_4H_9$ | | 154–165/0.8–1.5 |
| $H_3C$-$CH$-$CH_2$-<br>$\|$<br>$H_3C$-$N$-$CH_3$ | –⟨⟩– | | 166–168/1 |
| $H_3C$-$CH$-$CH_2$-<br>$\|$<br>$H_3C$-$N$-$CH_3$ | –⟨⟩–$Cl$ | | 177–180/0.5 |

The following examples illustrate the good herbicidal action of the agents according to this invention.

*Example 1*

3 kg. per hectare of N-p-ethoxyphenyl-N'-methyl-N'-(methyliminomethylene)-urea suspended in 1000 liters of water is sprayed on the following plants in the greenhouse: *Hordeum vulgare* (barley), *Sinapis alba* (mustard), *Chenopodium album* (white goosefoot), *Urtica urens* (stinging nettle) and *Galinsoga paraviflora* (gallant soldier).

The plants begin to wither and die from the tips of the leaves after three to four days. After ten to twelve days, mustard, white goosefoot, stinging nettle and gallant soldier have been almost completely destroyed, but no growth depression can be detected in the barley. The following have a similar action to N-p-ethoxyphenyl-N'-methyl-N'-(methyliminomethylene)-urea: N - phenyl-N'-n-propyl-N'-(n-propyliminomethylene)-urea, N - phenyl-N'-i-butyl-N'-(i - butyliminomethylene) - urea, N-phenyl-N'-n-butyl-N'-(n-butyliminomethylene) - urea, N-p-chlorophenyl-N'-methyl-N'-(methyliminomethylene)-urea, N-cyclohexyl-N'-methyl-N'-(methyliminomethylene)-urea.

*Example 2*

Weed-infested sandy loam is filled into clay dishes having the size 25 x 30 cm. and seeds of *Hordeum vulgare* (barley) are sown in the uppermost layer. N-p-chlorophenyl-N'-methyl-N' - (methyliminomethylene) - urea is sprayed onto the loam thus pretreated in the amount of 3 kg. per hectare as a dispersion in 1000 liters of water prepared by means of sodium ligninsulfonate as dispersing agent. The plants grow normally. Within three to four weeks after emergence, the following weeds have withered: *Chenopodium album* (white goosefoot), *Stellaria media* (chickweed), *Sinapis alba* (mustard), *Urtica urens* (stinging nettle) and *Galinsoga paraviflora* (gallant soldier); the barley on the contrary continues to grow without damage.

We claim:
1. A compound of the formula:

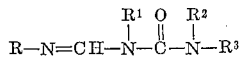

in which R and R¹ each represent a member selected from the group consisting of lower alkyl, said lower alkyl substituted by lower alkoxy and said lower alkyl substituted by dimethylamino, R² represents a member selected from the group consisting of hydrogen and methyl, and R³ represents a member selected from the group consisting of hydrogen, alkyl of 1 to 8 carbon atoms, cycloalkyl of 6 to 8 carbon atoms, phenyl, phenyl substituted by halogen and phenyl substituted by lower alkoxy.

2. N-p-ethoxyphenyl-N'-methyl-N'-(methyliminomethylene)-urea.
3. N - p - chlorophenyl - N' - methyl-N'-(methyliminomethylene)-urea.
4. N - phenyl - N'-methyl-N'-(methyliminomethylene)-urea.
5. N - 3,4-dichloro-phenyl - N'-methyl-N'-(methyliminomethylene)-urea.

References Cited by the Examiner

UNITED STATES PATENTS

| | | | |
|---|---|---|---|
| 2,624,761 | 1/1953 | Kaiser | 260—553 |
| 3,061,641 | 10/1962 | Wright et al. | 260—553 |
| 3,081,162 | 3/1963 | Tischler | 71—2.6 |
| 3,092,484 | 6/1963 | Salzberg | 71—2.6 |

NICHOLAS S. RIZZO, *Primary Examiner.*

HENRY R. JILES, *Examiner.*